No. 615,219.  E. S. HOTCHKISS.  Patented Nov. 29, 1898.
ANIMAL TRAP.
(Application filed June 15, 1898.)
(No Model.)  2 Sheets—Sheet 1.

Attest:  Inventor
Edward S. Hotchkiss
By Philipp, Phelps, Sawyer
Attys

No. 615,219. Patented Nov. 29, 1898.
E. S. HOTCHKISS.
ANIMAL TRAP.
(Application filed June 15, 1898.)
(No Model.)
2 Sheets—Sheet 2.
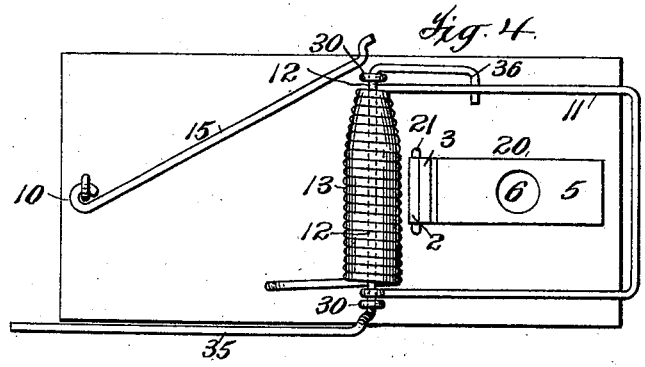
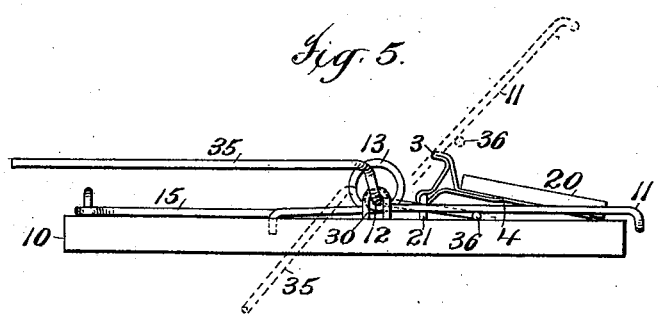
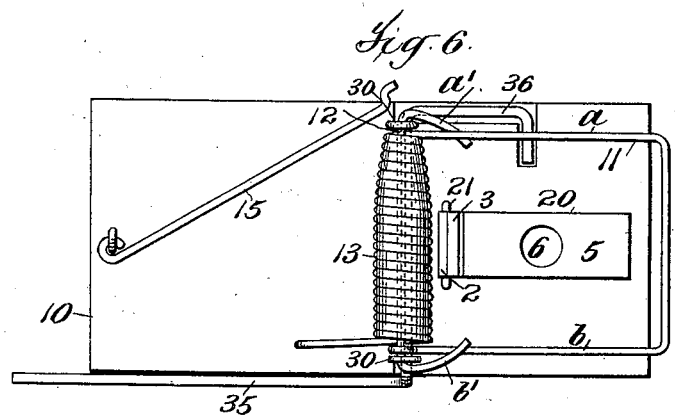
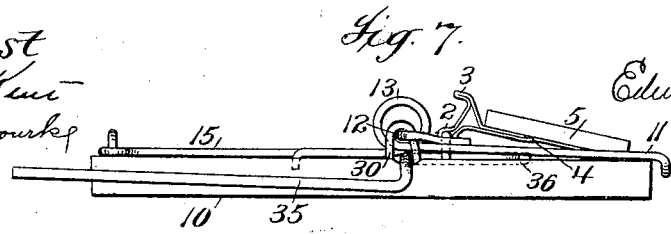
Attest
A. H. Kent
A. W. Bourke
Inventor
Edward S. Hotchkiss
By
Philipp, Phelps & Davy
Attys

UNITED STATES PATENT OFFICE.

EDWARD S. HOTCHKISS, OF BRIDGEPORT, CONNECTICUT.

ANIMAL-TRAP.

SPECIFICATION forming part of Letters Patent No. 615,219, dated November 29, 1898.

Application filed June 15, 1898. Serial No. 683,465. (No model.)

*To all whom it may concern:*

Be it known that I, EDWARD S. HOTCHKISS, a citizen of the United States, residing at Bridgeport, county of Fairfield, and State of Connecticut, have invented certain new and useful Improvements in Animal-Traps, fully described and represented in the following specification and the accompanying drawings, forming a part of the same.

This invention relates to animal-traps of that class in which the animal is caught by means of a spring-actuated jaw, which when the trap is sprung, as by the action of the animal, snaps shut and catches the animal between the jaw and the base of the trap.

The invention aims generally to provide an improved trap of this class, and especially to provide a trap from which an animal which has been caught can be easily and readily removed without touching it with the hand, to provide means for equalizing to a greater or less extent the tension on the two sides of the jaw to overcome the uneven tension on the jaw when the actuating-spring acts only on one side of the jaw, and to provide an improved trigger.

To these ends the invention consists in various features of construction and combinations of parts, all as will be hereinafter more fully described, and specifically set forth in the claims.

As a full understanding of the invention can best be given by a detailed description of a trap constructed in accordance with the invention, such a description will now be given in connection with the accompanying drawings, showing the preferred construction and modifications thereof.

Figure 1:
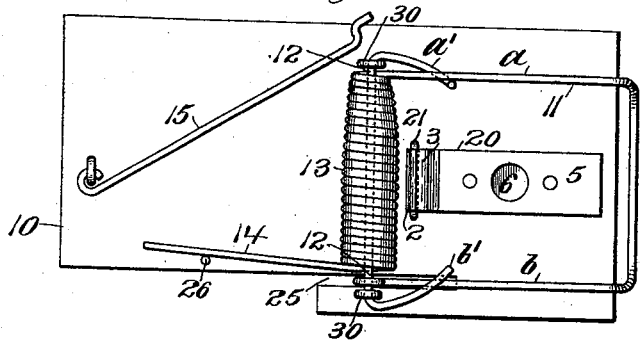
Figure 2:
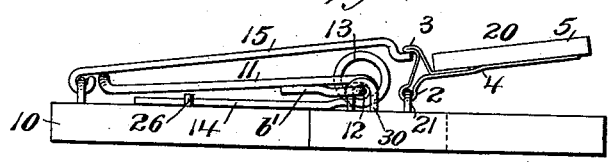
Figure 3:
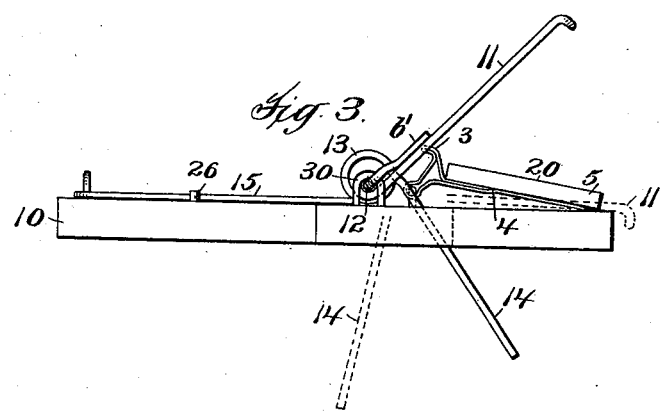
Figure 8:
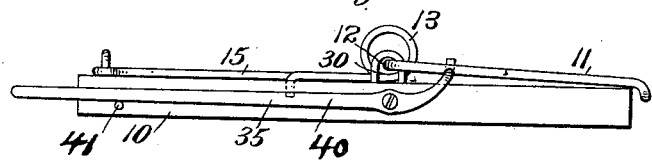

In said drawings, Figure 1 is a plan view of the preferred form of trap, the parts being shown in sprung or unset position. Fig. 2 is a side view showing the parts in set position. Fig. 3 is a side view showing the parts in sprung position and with the jaw raised to its releasing position and showing in dotted lines the jaw and releasing-arm in a position in which the tension of the spring has been released but the jaw has not yet been raised. Fig. 4 is a plan view of a modified construction, showing the parts in sprung position. Fig. 5 is a side view of the trap shown in Fig. 4 and showing in dotted lines the jaw and releasing-arm in releasing position. Fig. 6 is a plan view of a modification of the trap shown in Figs. 4 and 5. Fig. 7 is a side view of the trap shown in Fig. 6. Fig. 8 is a side view of a further modification.

Referring first to Figs. 1, 2, and 3, the base 10, by which the other parts of the trap are carried, may be of any suitable material, as wood. Mounted on the base is the swinging jaw 11. This jaw 11 is formed, preferably, of spring-wire, bent to form a loop, the central or outer portion of which preferably extends parallel with the end of the base and is preferably pivoted to the base by being mounted on a pin or arbor 12, extending transversely of the base, and which pin also preferably carries the coiled spring 13, which actuates the jaw. The spring 13 is preferably formed from the same piece of wire which forms the jaw 11, the wire beyond that portion forming one side *a* of the jaw being coiled to form a spring extending at right angles to the side of the jaw and preferably of a length nearly equal to the distance between the sides *a* and *b* of the jaw. The end 14 of the wire extending from the other end of the spring bears under tension on the base beyond the pin 12. The side *b* of the loop forming the jaw is pivotally connected to the pin 12 beyond the dead end of the spring, as by having its end formed into an eye extending about the pin.

A setting-bar 15 is pivoted to the base 10 to the rear of the pin 12 and at a distance therefrom slightly greater than the length of the jaw, preferably by a staple on the base and a loop on the end of the bar, so as to form a universal joint. The setting-bar is of a length to permit it to extend over and slightly forward of the spring 13 to be engaged by the catch of the trigger 20, as is shown in Fig. 2.

The trigger 20 in the preferred form shown, which constitutes a part of the invention, is formed from a strip of sheet metal bent to form an eye 2 and a catch 3 above the eye and the ends of which beyond the eye 2 and catch 3, respectively, are brought together to form the forwardly-extending actuating-arm 4. Both ends of the strip may be extended the whole length of the arm 4; but this is not necessary, and one end may be shorter than the other, as shown. The trigger is pivoted to the base 10 close to and in front of the spring 13 by means of a staple 21. The arm 4 preferably carries a flat block of wood 5, formed with a bait-holding hole or recess 6.

The trap is set by turning the jaw back over the pin 12 and down against the base to the position shown in Fig. 2, then bringing the setting-bar down over the jaw to engage the jaw near the point of connection of the setting-bar with the base and catching the end of the bar beneath the catch 3 of the trigger. The parts will then be in the position shown in Fig. 2, the arm 4 of the trigger being raised from the base. If then the trigger is depressed, (and a very slight force will be sufficient,) the bar 15 will be released and flying up under the pressure exerted by the jaw will release the jaw, which will be swung back by the spring 13 and snap down on the front part of the base with great force, imprisoning the victim.

In order that an animal which has been caught between the jaw and the part of the base with which it coacts may be readily and conveniently released, I provide means for moving one of said members away from the other, preferably by raising the jaw from the base and preferably as shown in Figs. 1, 2, and 3. The base 10 is formed with a slot 25, extending longitudinally of the base just inside the point of connection of the pin 12 with the base beyond the dead end of the spring 13 and extends a short distance forward of the pin 12. The base is preferably cut away from a point a little to the rear of the pin 12 and on a line with the inner wall of the slot, as shown in Fig. 1.

The wire end 14, which forms a jaw-releasing arm, is normally held in position on the base to maintain the tension of the spring by means of a pin 26. When it is desired to release the tension and raise the jaw, the wire end or releasing-arm 14 is raised clear of the pin 26 and moved laterally over and allowed to descend through the slot 25. The tension of the spring is such that when the arm 14 has reached about the position shown in dotted lines in Fig. 3 the tension of the spring will be released, and further movement of the arm 14 to the position shown in full lines in Fig. 3 will cause the jaw to be raised to the position shown in said figure. The tension of the spring is thus first released and the jaw then raised from the base.

It will be noticed that the pressure of the spring 13 is exerted on only one side of the jaw. To avoid the uneven tension on the jaw which this would tend to produce, I provide a rod formed, preferably, of spring-wire and extending, preferably, through the spring 13 and having arms $a'$ $b'$ extending at an angle to the central portion of the wire to engage the sides $a$ and $b$, respectively, of the loop forming the jaw 11, and the arm $a'$ bearing on that side of the side $a$ of the jaw which is toward the base when the jaw is in its sprung position, as shown in Fig. 1, and which may be called the "lower side," and the arm $b'$ bearing on the opposite or upper side of the side $b$ of the jaw, and the arms $a'$ and $b'$ being under tension when so engaging the sides of the jaw, so that the arm $b'$ will bear down on the side $b$ of the jaw. The tension of the spring 13, exerted on the side $a$ of the jaw, will thus be carried through the arms $a'$ and $b'$ and the connecting-rod to the side $b$ of the jaw, and by making the arms $a'$ and $b'$ and connecting-rod of sufficient strength and proper form the tension on the two sides of the jaw can thus be equalized. The rod carrying the arms $a'$ and $b'$ is preferably formed by the pin or mandrel 12, on which the jaw is pivoted, this pin itself being pivotally connected to the base, as by eyes or staples 30.

In Figs. 4 and 5 I have shown a modified construction for raising the jaw from the base for releasing an animal which has been caught. As here shown, the wire forming the pin 12 is pivotally secured to the base by staples or eyes 30, as before, but is extended rearwardly on one side of the trap and beyond the side edge of the base 10 to form a releasing-arm 35. At the other end of the pin 12 the wire is extended forwardly and inwardly to form an arm 36, extending beneath the jaw. When the arm 35 is depressed, therefore, the arm 36 will be raised and will raise the jaw to the position shown in dotted lines in Fig. 5.

Figs. 6 and 7 show a modification of the construction shown in Figs. 4 and 5, in which the releasing-arm 35 and jaw-engaging arm 36 are not carried by the pin 12, but by a rod extending longitudinally of the spring 13 outside of and beneath the spring, the base 10 being preferably grooved transversely to accommodate such bar and being also preferably cut away, as shown in Fig. 6, for the arm 36.

Fig. 8 shows a further modification, in which the releasing-arm 35 and jaw-engaging arm 36 are formed by the two ends of a lever 40, pivoted to one edge of the base and held in normal position by a pin 41, past which the arm 35 is sprung when it is to be thrown downward to raise the jaw.

Other modifications of the various features of my invention will undoubtedly occur to those skilled in the art, and it is to be understood that I am not to be limited to the exact constructions shown for the purpose of illustrating the invention and to which the foregoing description has been mainly confined, but that the invention includes changes and modifications thereof within the claims.

What I claim is—

1. An animal-trap having a base, a spring-actuated jaw, jaw setting and releasing devices, and means independent of the jaw setting and releasing devices for releasing an animal caught between the jaw and the part of the base with which it coacts by moving one of said members away from the other, substantially as described.

2. An animal-trap having a base, jaw setting and releasing devices, an arm for raising the jaw from the base to release an animal which has been caught, and a spring-actuated jaw having a movement independent of said arm in the setting and springing movements of the jaw to permit a movement of said jaw greater than the movement of said arm, substantially as described.

3. An animal-trap having a base, a spring-actuated jaw, jaw setting and releasing devices, and an arm independent of the jaw setting and releasing devices for raising the jaw from the base to release an animal which has been caught, said parts extending substantially parallel with the base when the trap is set, substantially as described.

4. An animal-trap having a base, a spring-actuated jaw, jaw setting and releasing devices, and means for taking the tension off the jaw when it is in its sprung position, substantially as described.

5. An animal-trap having a base, a spring-actuated jaw, jaw setting and releasing devices, and means for taking the tension off the jaw when it is in its sprung position and for raising the jaw from the base to release an animal which has been caught, substantially as described.

6. An animal-trap having a base, a spring-actuated jaw, jaw setting and releasing devices, and a rearwardly-extending releasing-arm independent of the jaw setting and releasing devices for raising the jaw from the base to release an animal which has been caught, substantially as described.

7. An animal-trap having a base, a spring-actuated jaw, setting devices engaging the jaw to hold the trap set, and means for releasing an animal caught between the jaw and the part of the base with which it coacts by moving one of said members away from the other, substantially as described.

8. An animal-trap having a base, a spring-actuated jaw, setting devices engaging the jaw to hold the trap set, and an arm for raising the jaw from the base to release an animal which has been caught, substantially as described.

9. An animal-trap having a base, a swinging jaw, a coiled spring for actuating the jaw, and an arm extending from the dead end of the coiled spring normally engaging the base to hold the spring under tension and movable to release the tension on the spring and raise the jaw from the base, substantially as described.

10. An animal-trap having a base, a swinging jaw, and a coiled spring for actuating the jaw arranged longitudinally of the axis about which the jaw swings and having one end of the wire from which it is formed extending rearwardly to form a releasing-arm 14, the base being formed with a slot 25 to receive the arm 14 when it is moved downward, substantially as described.

11. The combination of a base, a swinging jaw, an actuating-spring exerting pressure on one side of the jaw, and a member having arms bearing on the jaw near the opposite edges thereof, one on the lower and the other on the upper face thereof, to carry the tension from the side of the jaw on which the spring acts to the other side of the jaw, substantially as described.

12. The combination of a base, a swinging jaw and actuating-spring therefor formed from a wire bent to form a loop and a coiled actuating-spring extending from the end of one side of the loop transversely to the sides of the loop, and means additional to said wire for carrying the tension from the side of the jaw on which the spring acts to the other side of the jaw, substantially as described.

13. The combination of a base, a rod 12 journaled on the base, a jaw journaled on said rod, and an actuating-spring exerting pressure on one side of the jaw, said rod 12 having arms bearing on the jaw near the opposite edges thereof and one on the lower and the other on the upper face thereof to carry the tension from the side of the jaw on which the spring acts to the other side of the jaw, substantially as described.

14. The combination of a base, a swinging jaw and actuating-spring therefor formed from a wire bent to form a loop having sides $a$, $b$ and a coiled actuating-spring extending from the end of the side $a$ of the loop transversely, a rod 12 journaled on the base and extending through the spring to form the pin on which the jaw swings, the side $b$ of the loop being pivotally connected to the rod 12 beyond the dead end of the spring, said rod having arms $a'$, $b'$, the arm $a'$ bearing on the under side of the side $a$ of the loop and the arm $b'$ bearing on the upper side of the side $b$ of the loop, substantially as described.

15. An animal-trap having a base, a spring-actuated jaw, a setting-bar, and a trigger formed of a strip of metal bent to form the eye 2 and catch 3 and having its ends brought together to form the double arm 4, a wooden bait-block 5 secured to the double arm 4 and thereby pivoted by the eye 2 and means independent of the jaw for raising it from the base, substantially as described.

In testimony whereof I have hereunto set my hand in the presence of two subscribing witnesses.

EDWARD S. HOTCHKISS.

Witnesses:
D. FAIRCHILD WHEELER,
ERNEST P. LYON.